Aug. 18, 1931.  C. C. TOMKINSON  1,819,828

TOGGLE BOLT

Filed Aug. 22, 1928

INVENTOR
Charles C. Tomkinson
BY
Marshall & Hawley
ATTORNEYS

Patented Aug. 18, 1931

1,819,828

UNITED STATES PATENT OFFICE

CHARLES C. TOMKINSON, OF PLAINFIELD, NEW JERSEY, ASSIGNOR, BY MESNE ASSIGNMENTS, TO J. EDWARD OGDEN COMPANY, OF NEW YORK, N. Y., A CORPORATION OF NEW JERSEY

TOGGLE BOLT

Application filed August 22, 1928. Serial No. 301,207.

This invention relates to a toggle bolt.

The invention has for its salient object to provide a toggle bolt that is simple and practical in construction, comprises a minimum number of parts, and can be economically manufactured.

Another object of the invention is to provide a toggle bolt so constructed and arranged that the parts can be readily assembled.

Further objects of the invention will appear from the following specification taken in connection with the drawings, which form a part of this application, and in which Fig. 1 is an elevation of one form of toggle bolt constructed in accordance with the invention, the wings being spread apart or expanded;

The invention briefly described consists of a toggle bolt structure comprising a bolt and a pair of wings pivotally associated therewith and also pivotally connected to each other. The wings are formed of resilient material, preferably of wire, and are so pivotally associated with the bolt and so pivoted to each other that they tend to spread apart or swing away from each.

Further details of the invention will appear from the following description.

Figure 1:
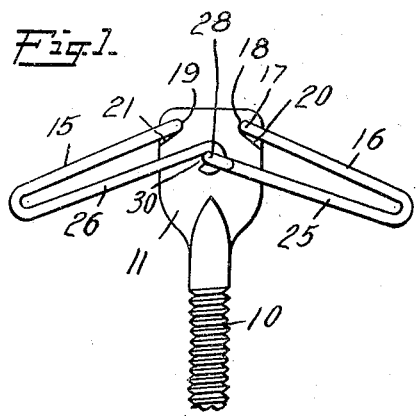
Figure 2:
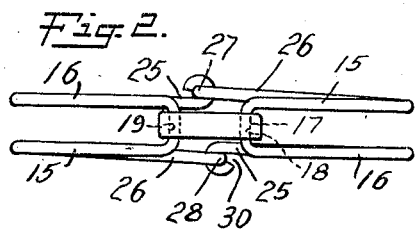
Fig. 2 is a top plan view of the structure shown in Fig. 1.

This application is a continuation in part of application Serial No. 174,130, filed March 10, 1927, Figs. 1 and 2 of this application corresponding to and being substantially identical with Figs. 30 and 31 of application Serial No. 174,130.

Figure 3:
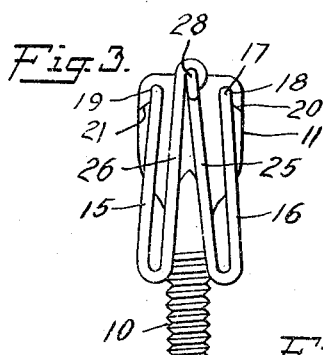
Fig. 3 is a view similar to Fig. 1 but showing the wings in folded position.

In the form of the invention illustrated in Figs. 1 to 3 inclusive, there is shown a bolt 10 having its upper end 11 flattened. A pair of wings are pivotally connected to the flattened upper end 11 of the bolt. Each wing comprises a U-shaped portion having legs 15 and 16 connected by a portion 17. The portions 17 of the wings are pivoted to the flattened portion 11 of the bolt, as shown at 18 and 19. In order to facilitate the insertion of the portions 17 of the wings into the pivotal openings, the flattened upper end 11 of the bolt is slit, as shown at 20 and 21.

The wings, as illustrated in the drawings, are formed of resilient material, preferably of wire, and the wire forming the legs 15 and 16 is bent back on itself to form legs 25 and 26. The legs 25 and 26 of one wing are pivoted at their ends, as shown at 27 and 28, to the legs 25 and 26 of the other wing. This pivotal connection is made by forming eyes at the ends of the legs 25 and 26, the eyes being partially open, as shown at 30. By reason of this construction, the pivotal connection can be made easily and readily by positioning the eyes in such a manner that the open portions thereof register with each other. It will be noted that the open portions of the eyes are not disposed opposite or in registration with each other in any operative positions of the wings. Also, as clearly illustrated in the drawings and particularly in Figs. 2 and 5, the legs 25 and 26 of the wings are longer than the legs 15 and 16.

The pivotal connections between the wings and the bolt and between the legs of the wings are so located that the wings normally take the position illustrated in Figs. 1 and 2 or, in other words, are normally spread. When the device is to be inserted in a hole, the wings are folded, as shown in Fig. 3, and are held in this position until the toggle bolt is positioned in the hole to a sufficient extent for the wall of the opening to engage and hold the wings. After the end of the bolt and wings have passed through the hole, the wings will be automatically spread to the position shown in Fig. 1.

From the showing in the drawings it will be seen that when the wings are spread, the legs of the wings are spread apart to a greater angle than when the wings are folded. As the wings are folded, the legs 15 and 26 and 16 and 25 approach each other, thus placing the wings under tension which tends to spread the wings to open position. This action may also be expressed as follows: As the pivotal connections between the wings indicated at 27 and 28 are forced upwardly as the wings are folded, the legs of the wings are forced closer together, the tension tending to spread the legs apart and spread the wings to open position.

Figure 4:
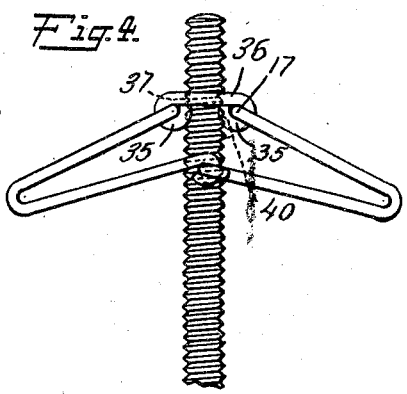
Fig. 4 is a view similar to Fig. 1 but illustrating another form of the invention.
Figure 5:
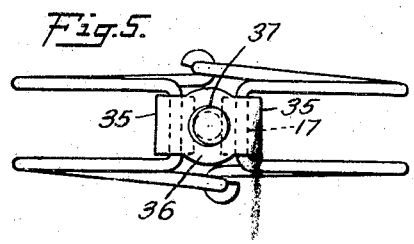
Fig. 5 is a top plan view of the structure shown in Fig. 4.
Figure 6:
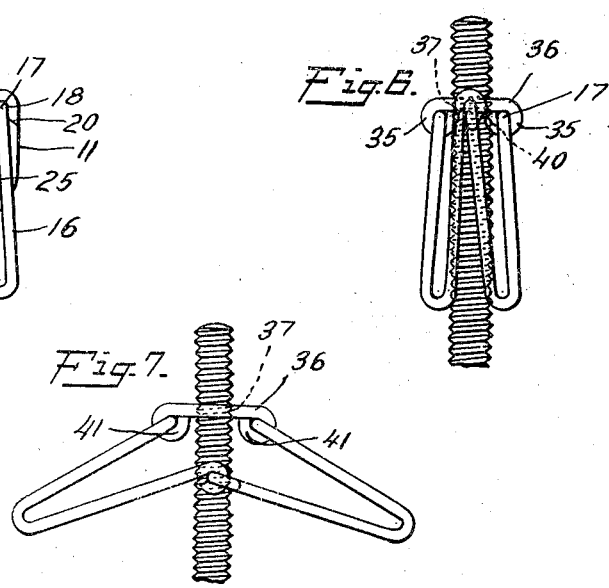
Fig. 6 is a view similar to Fig. 4 but showing the wings in folded position.

In the form of the invention illustrated in Figs. 4, 5 and 6, the wing construction is substantially the same as that shown in Figs. 1, 2 and 3. In this embodiment of the invention, however, the portions 17 of the wings are pivoted in eyes 35 formed on a saddle or nut 36 having a threaded opening 37 therein, through which the bolt can be threaded. The inner portions 40 of the eyes 35 are also provided with screw threads for receiving the bolt.

Figure 7:
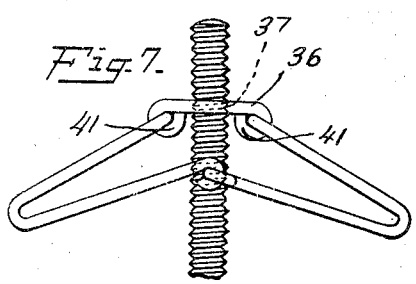
Fig. 7 is a view similar to Fig. 4 but illustrating a slightly different form of the invention.

The construction shown in Fig. 7 is the same as that shown in Figs. 4, 5 and 6, except that the eyes 41 are spaced laterally from the bolt and are not in alinement with a portion of the opening 37 through the saddle 36. In this form of the invention, the eyes do not have screw threads formed therein.

From the foregoing description it will be clear that a simple, practical and inexpensive form of toggle bolt has been designed and that by reason of the construction described, the wings can be readily assembled with a minimum amount of labor. Furthermore, due to the resiliency of the material and to the particular arrangement of the parts, no additional springs or equivalent parts are required.

Although certain specific embodiments of the invention have been particularly shown and described, it will be understood that the invention is capable of modification and that changes in the construction and in the arrangement of the various cooperating parts may be made without departing from the spirit or scope of the invention, as expressed in the following claims.

What I claim is:

1. A toggle bolt structure comprising a bolt, and a pair of wings, each wing being independently, pivotally associated with the bolt and directly pivotally connected to the other wing, the ends of the wings remote from the pivoted ends being free.

2. A toggle bolt structure comprising a bolt, and a pair of wings formed of resilient material, each wing being independently, pivotally associated with the bolt and pivotally connected to the other wing, the resiliency of the material of the wings and the pivotal connections causing the wings to spread apart.

3. A toggle bolt structure comprising a bolt, and a pair of wings formed of resilient material and pivotally associated therewith and pivotally connected to each other, said wings being so pivotally associated with the bolt and so pivoted to each other that they are biased to spread away from each other due to the resiliency of the material.

4. A toggle bolt structure comprising a bolt, and a pair of wings formed of resilient wire and each pivotally associated therewith, each wing being pivotally connected to the other wing, the resiliency of the wings and the pivotal connections causing the wings to spread apart.

5. A toggle bolt structure comprising a bolt, and a pair of wings, each pivotally associated therewith, each wing being pivotally connected to the other wing and consisting of a resilient wire loop.

6. A toggle bolt structure comprising a bolt, and a pair of wings consisting of a pair of loops, each loop having one end pivotally associated with the bolt and having its other end pivotally connected to the other loop.

7. A toggle bolt structure comprising a bolt, and a pair of wings consisting of a pair of resilient loops, each loop having one end pivotally associated with the bolt and having its other end pivotally connected to the other loop.

8. A toggle bolt structure comprising a bolt, and a pair of wings consisting of a pair of loops, each loop having one end pivotally associated with the bolt and having its other end pivotally connected to the other loop, the legs of the loops pivotally associated with the bolt being shorter than the legs of the loops connected to each other.

9. A toggle bolt structure comprising a bolt, and a pair of wings pivotally associated with said bolt, each wing comprising a U-shaped portion pivotally associated with the bolt, the legs of the U-shaped portions having portions pivotally connected to each other.

10. A toggle bolt structure comprising a bolt, and a pair of wings pivotally associated with said bolt, each wing comprising a U-shaped portion pivotally associated with the bolt, the legs of the U-shaped portions having portions pivotally connected to each other, said pivotally connected portions being longer than the legs of the U-shaped portions.

11. A toggle bolt structure comprising a bolt, and a pair of wings pivotally associated with said bolt, each wing consisting of a single piece of material and having one portion pivotally associated with the bolt and having another portion directly pivoted to a portion of the other wing.

12. A toggle bolt structure comprising a bolt, and a pair of wings pivotally associated with said bolt, each wing being formed of wire and comprising a U-shaped portion pivotally associated with the bolt and having legs pivotally connected to the legs of the other wing.

13. A toggle bolt structure comprising a bolt, and a pair of wings pivotally associated with said bolt, each wing being formed of a single piece of wire and comprising a U-shaped portion pivotally associated with the bolt and having legs pivotally connected to the legs of the other wing.

14. A toggle bolt structure comprising a bolt, a saddle mounted thereon, and a pair of wings, each pivoted to said saddle and to the other wing.

15. A toggle bolt structure comprising a bolt, a saddle mounted thereon, and a pair of wings formed of resilient material and pivoted to said saddle and to each other, said wings being so pivoted to the saddle and to each other that they are biased to spread apart due to the resiliency of the material.

16. A toggle bolt structure comprising a bolt, a saddle mounted thereon, and a pair of wings, each having a U-shaped portion pivoted to the saddle and having other portions pivoted to the other wing.

17. A toggle bolt structure comprising a bolt, a saddle mounted thereon, and a pair of resilient wings having U-shaped portions pivoted to the saddle and having other portions pivoted to each other.

18. A toggle bolt structure comprising a bolt and a pair of wings pivotally associated with the bolt, each wing having a resilient, integral portion engaging a resilient, integral portion of the other wing to cause the wings to spread from closed to open position due to the engagement between the resilient portions of said wings.

19. A toggle bolt structure comprising a bolt and a pair of wings pivotally associated with said bolt, one of the wings having an integral portion resiliently engaging the other wing.

20. A truss structure comprising a supporting member and a pair of foldable wings associated with said supporting member, said wings having integral resilient interconnecting portions adapted to expand the wings to truss formation and to form the lower chord of the truss structure.

In witness whereof, I have hereunto set my hand this 30th day of July, 1928.

CHARLES C. TOMKINSON.